April 9, 1929. W. M. ROBERTS 1,708,898
MACHINE FOR MAKING ICE CREAM CONES
Filed Jan. 19, 1925 13 Sheets-Sheet 1

INVENTOR.
WEBSTER M. ROBERTS,
BY Toulmin & Toulmin
ATTORNEYS.

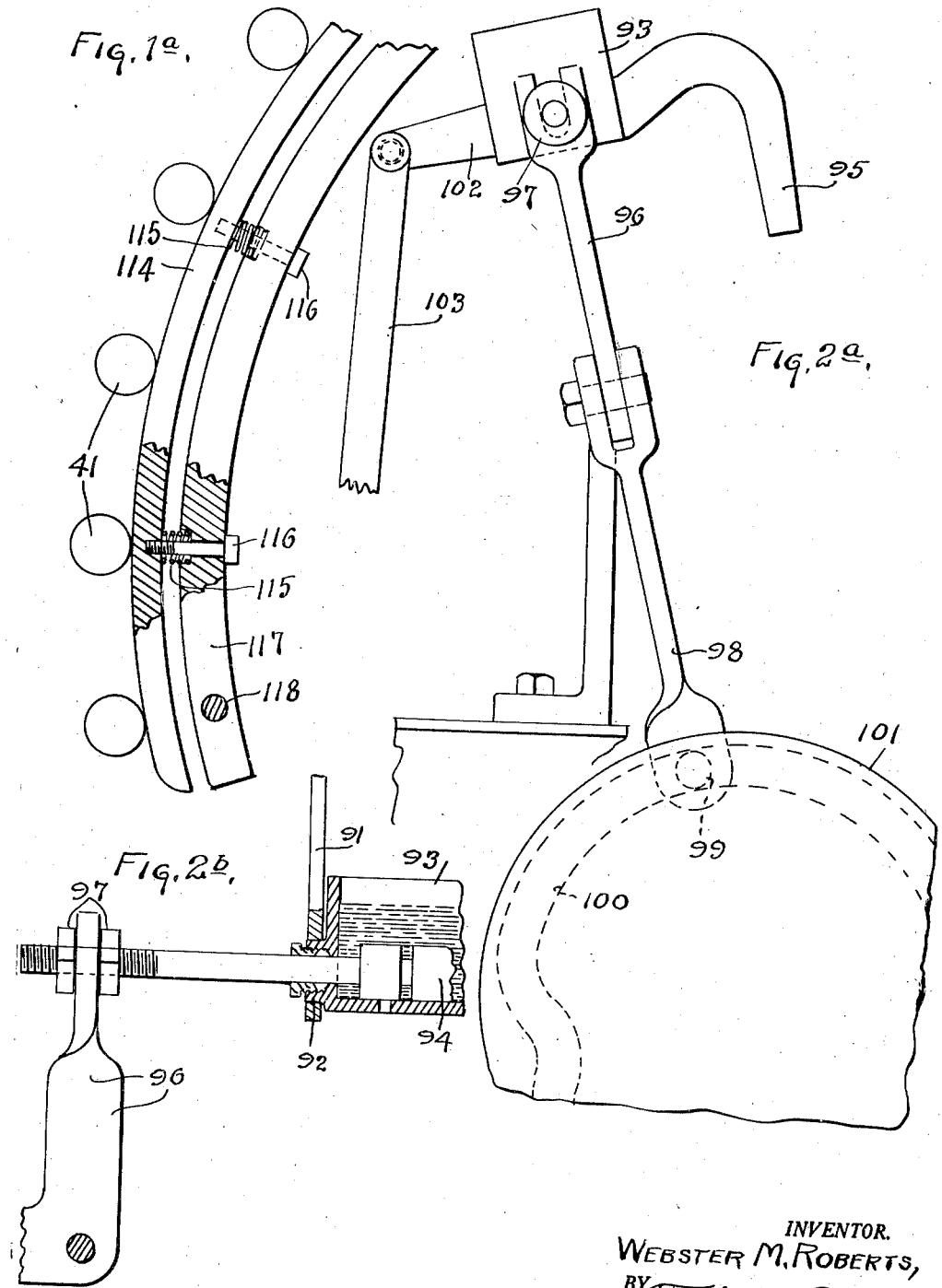

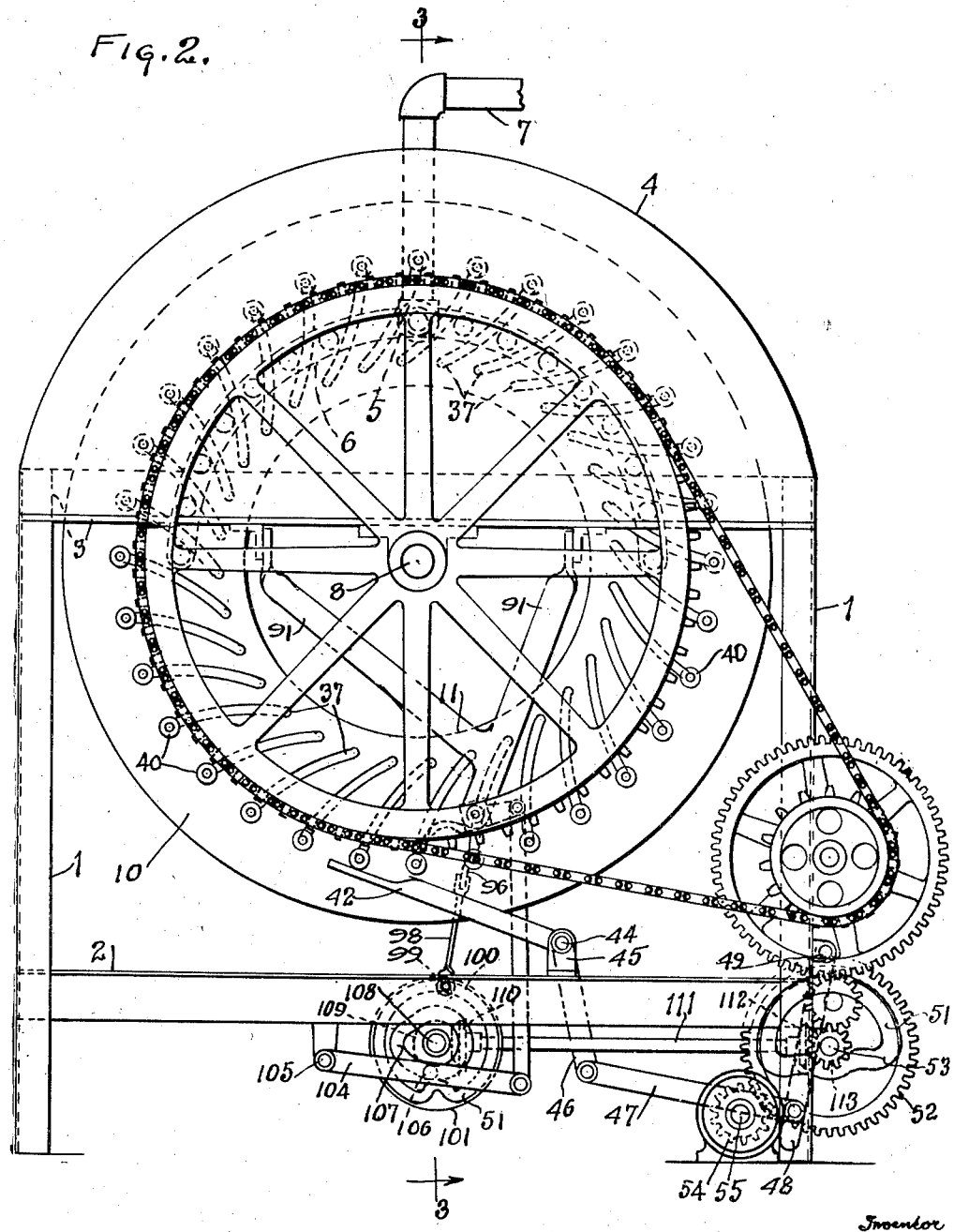

April 9, 1929.  W. M. ROBERTS  1,708,898
MACHINE FOR MAKING ICE CREAM CONES
Filed Jan. 19, 1925  13 Sheets-Sheet 4

INVENTOR.
WEBSTER M. ROBERTS,
BY Toulmin & Toulmin
ATTORNEYS.

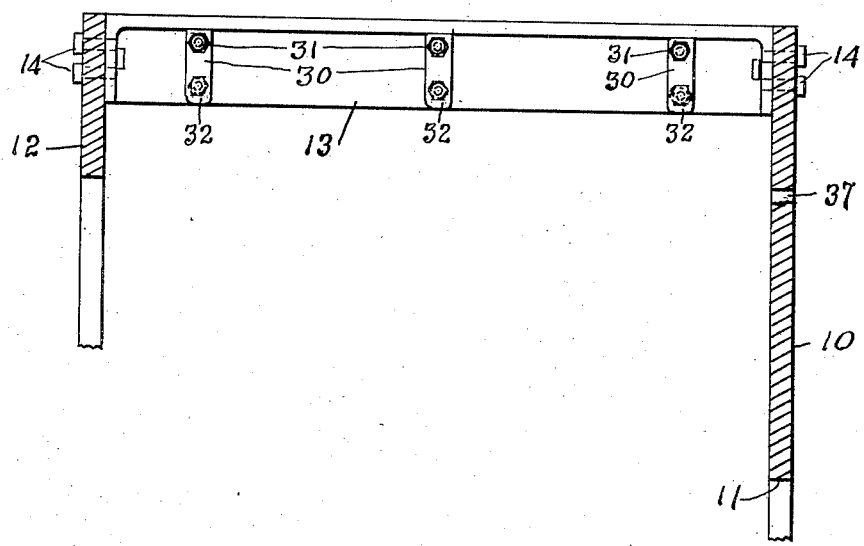
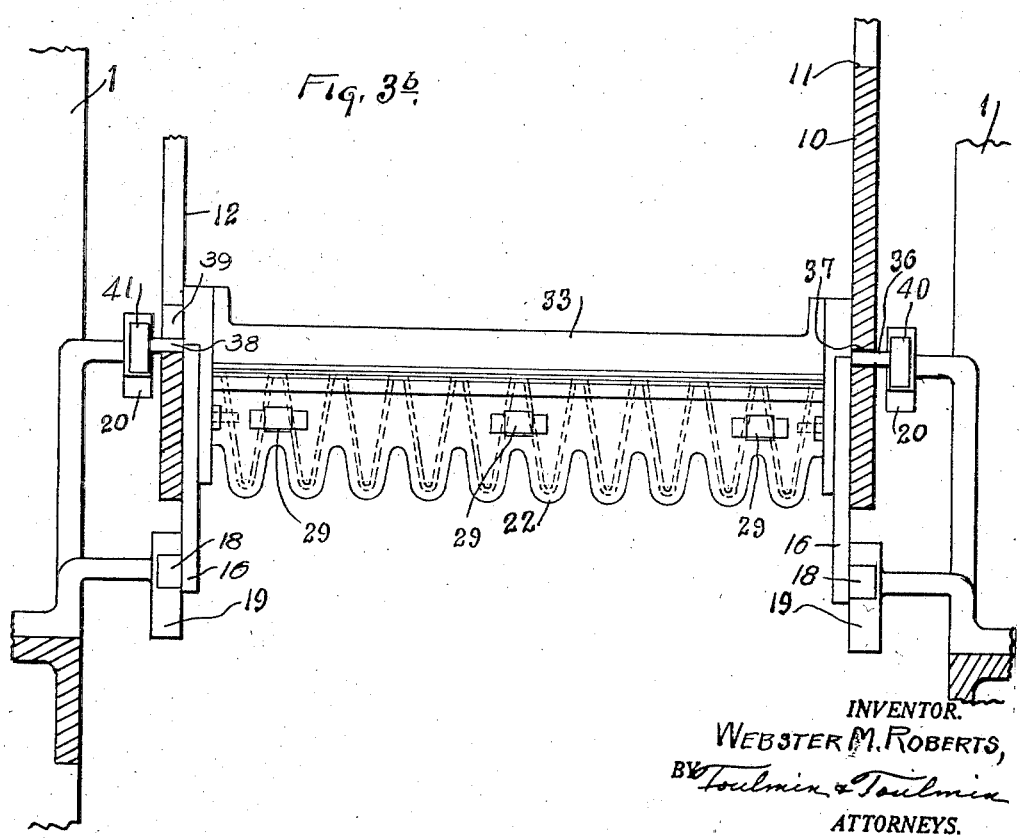

April 9, 1929.   W. M. ROBERTS   1,708,898
MACHINE FOR MAKING ICE CREAM CONES
Filed Jan. 19, 1925   13 Sheets-Sheet 6

INVENTOR.
WEBSTER M. ROBERTS,
BY Toulmin & Toulmin
ATTORNEYS.

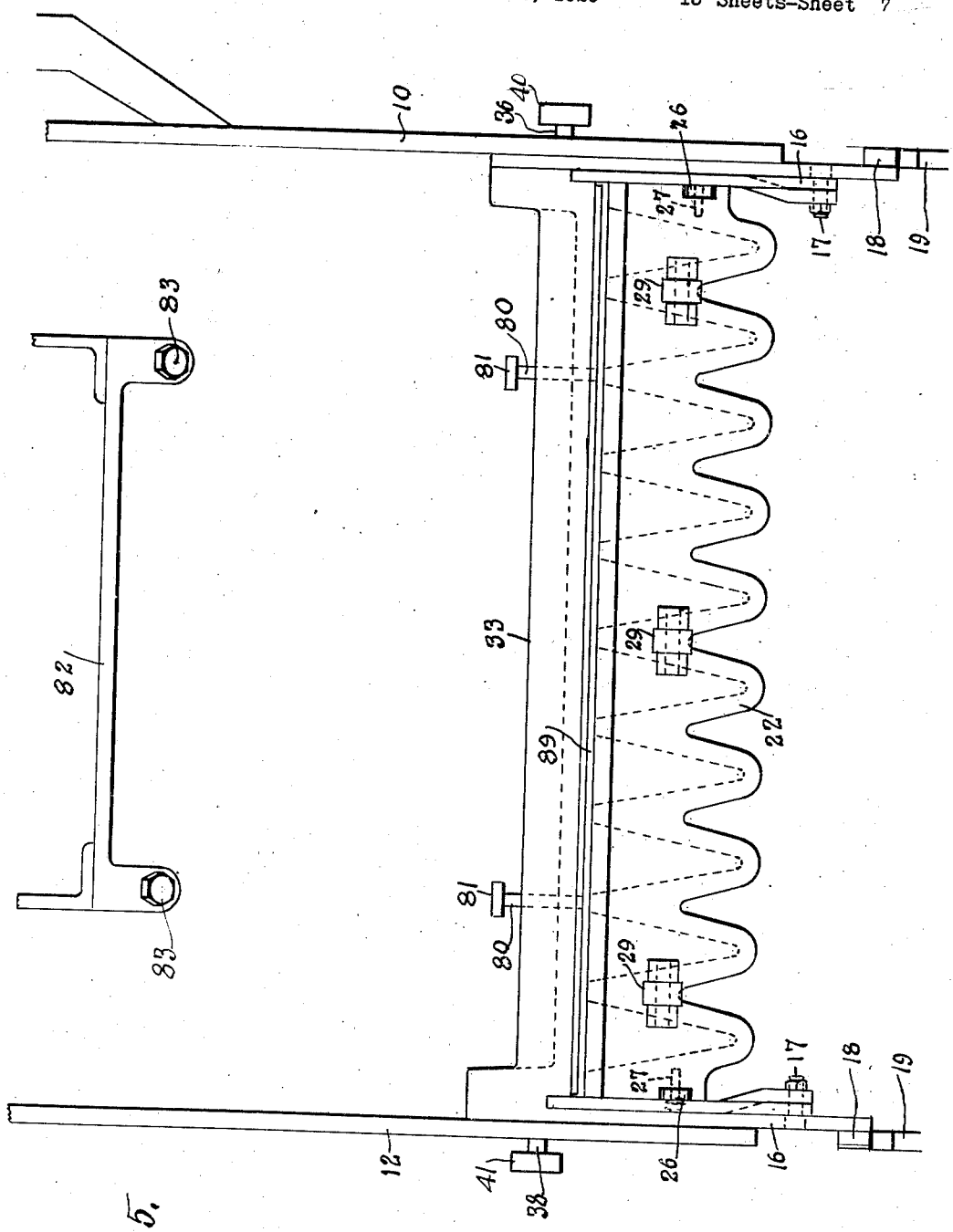

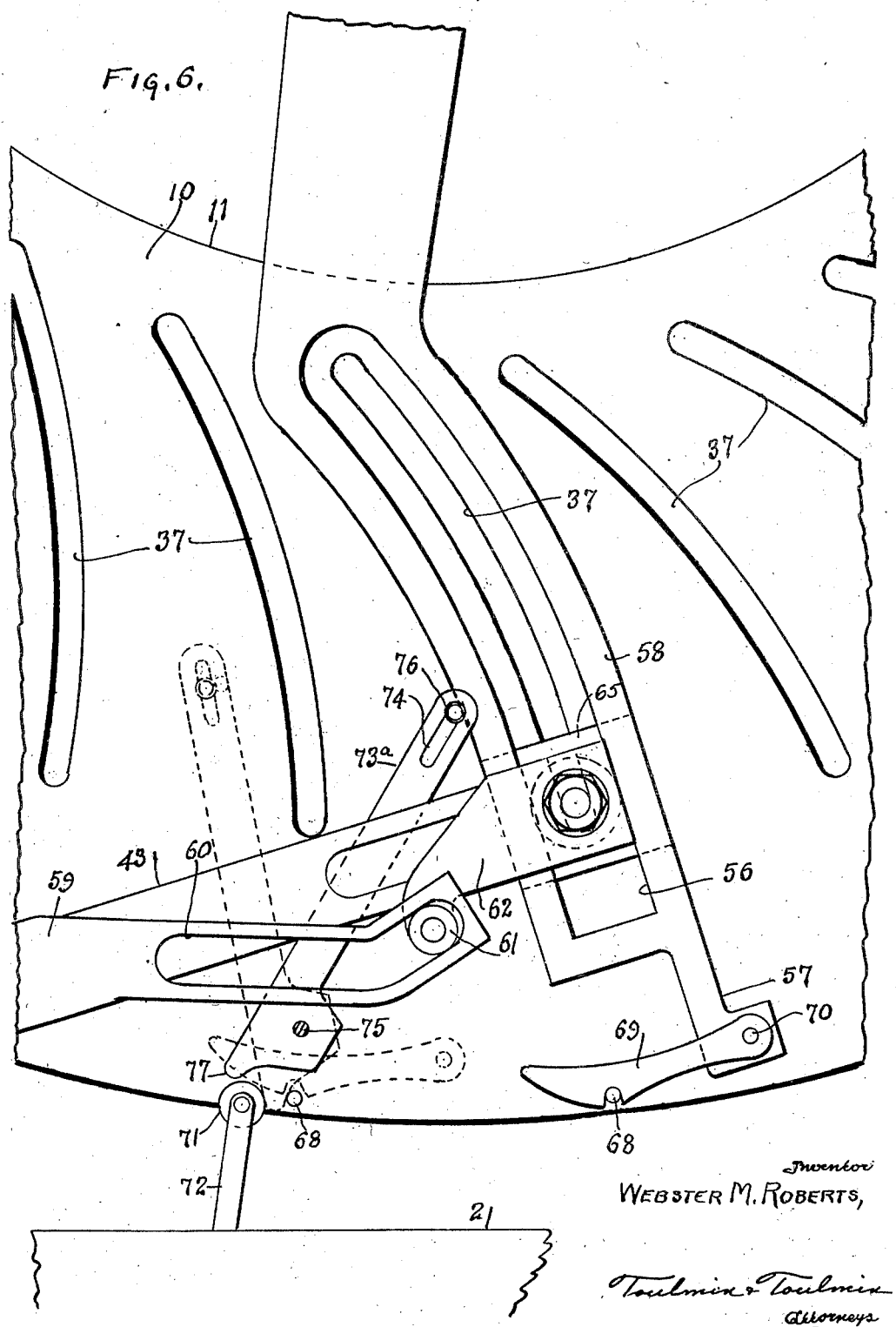

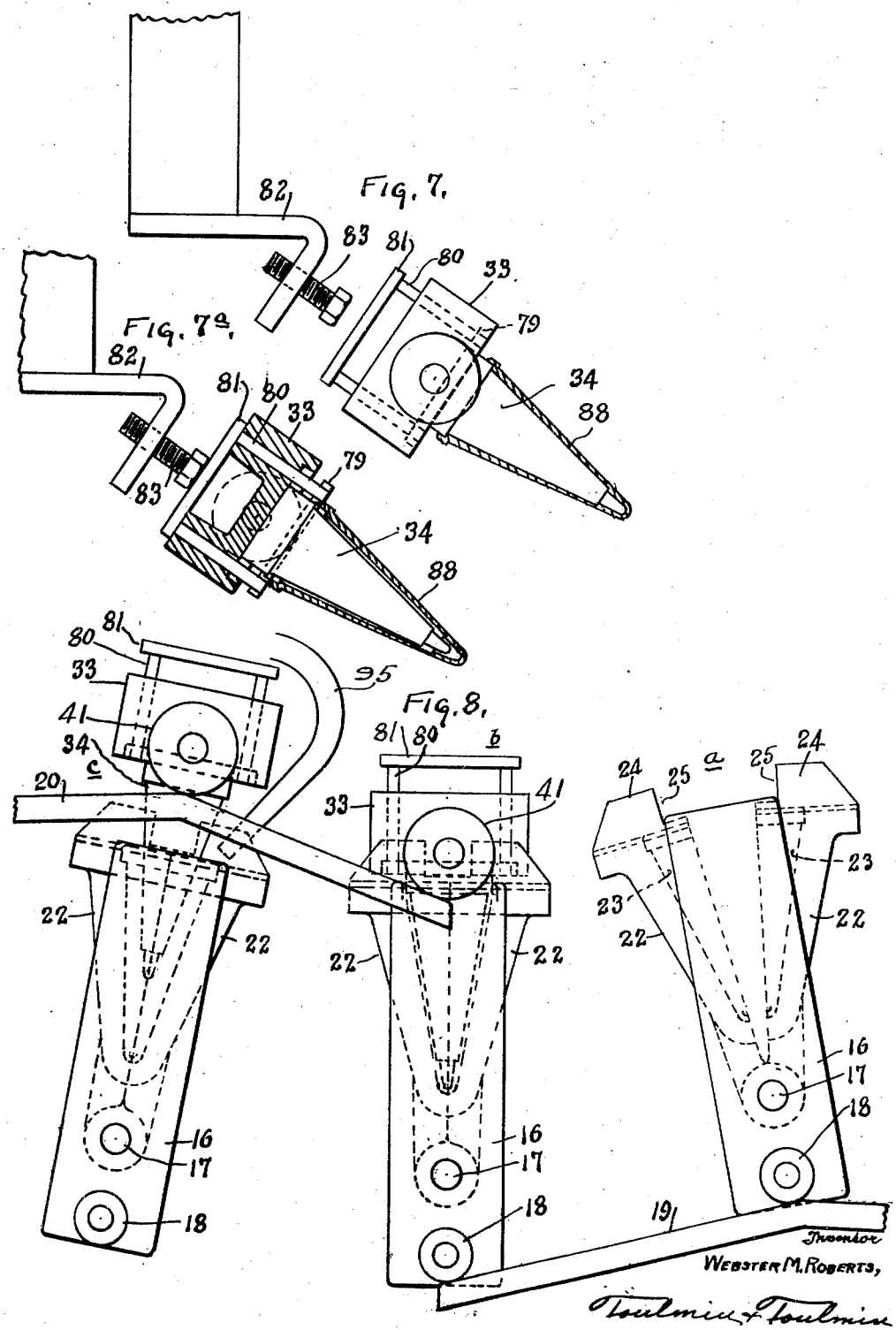

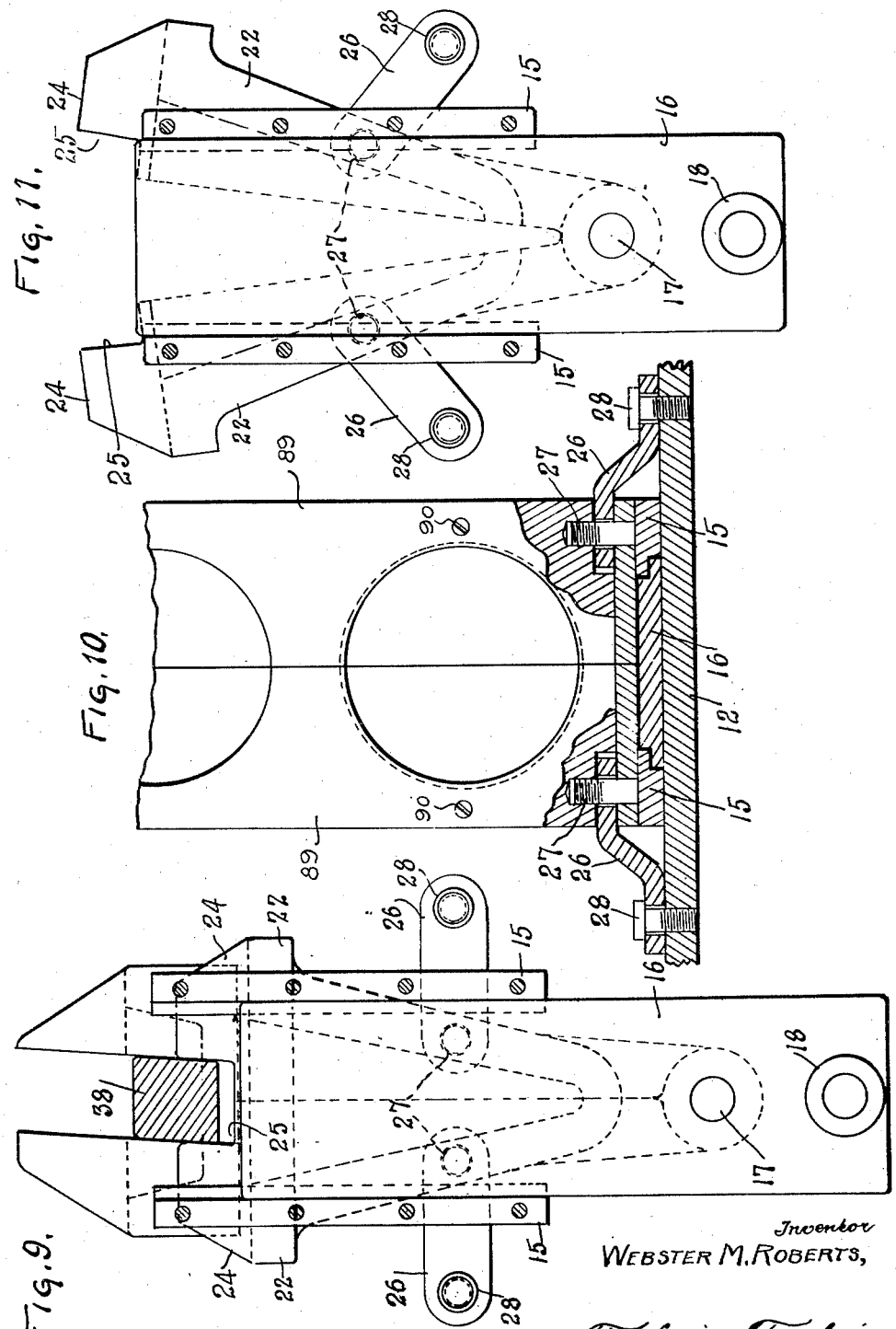

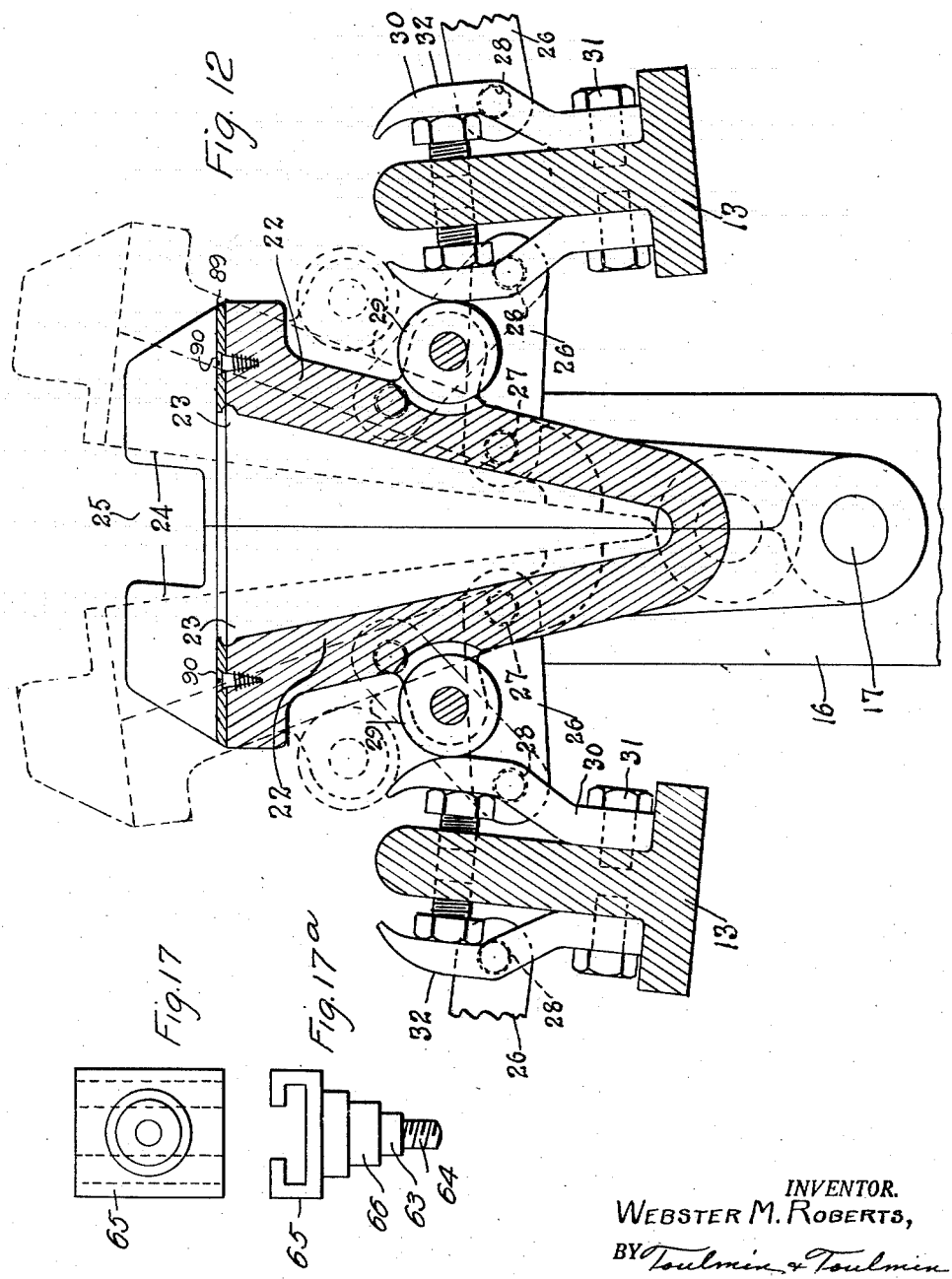

April 9, 1929.  W. M. ROBERTS  1,708,898
MACHINE FOR MAKING ICE CREAM CONES
Filed Jan. 19, 1925  13 Sheets-Sheet 12

Inventor
WEBSTER M. ROBERTS,
Toulmin & Toulmin
Attorneys

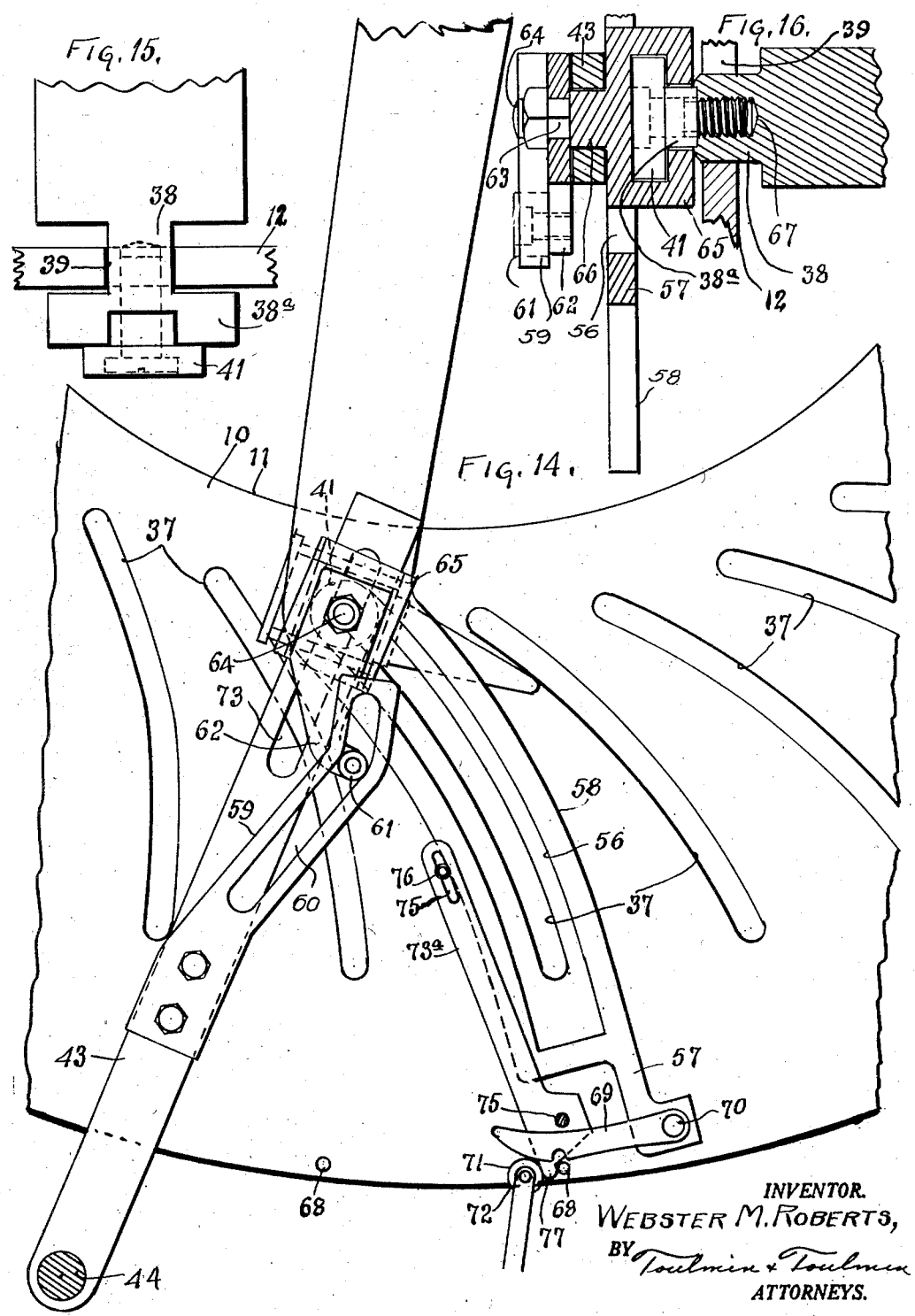

Patented Apr. 9, 1929.

1,708,898

UNITED STATES PATENT OFFICE.

WEBSTER M. ROBERTS, OF ST. JOSEPH, MISSOURI, ASSIGNOR TO McLAREN-CONSOLIDATED CONE CORPORATION.

MACHINE FOR MAKING ICE-CREAM CONES.

Application filed January 19, 1925. Serial No. 3,299.

My invention relates to an improved machine for the automatic manufacture of what is known as ice cream cones.

These cones are made of batter which when baked forms an edible article in the shape of a cone or cornucopia in which the retail ice-cream dealer serves his cream to patrons.

This is not a new art, that is, the art of manufacturing ice cream cones is an old and well-known one. But in this time of sharp commerical competition in the manufacture and sale of these ice cream cones, refinements in cone-making machines to facilitate and cheapen production and to make more perfect and finished cones become a matter of importance.

This invention is regarded as a distinct step in advance with respect to a highly efficient cone-making machine whereby the cones are not only more perfectly made but are produced in large quantities per hour or unit of time; and are completely automatically made from the liquid batter to the finished product.

The leading features of my invention are substantially as follows:—

A new mode and means of withdrawing the cores from the molds.

A new mode and means for closing the mold halves by the utilization of pressure on the halves at one or more points intermediate the ends of the molds, which results in preventing what is known as the "springing of the mold halves", that is to say; the tendency of the mold halves to spring apart due to the internal steam pressure generated from the moisture content of the batter when the molds become heated. It is common to secure the ends of the mold halves together by various locking means. This feature of my invention relates to binding the halves together by appropriate pressure at points intermediate the ends of the mold so as to resist this springing tendency.

A new mode and means of opening the mold halves by means of links which draw on the halves as the mold is elevated out of its closing-devices.

A new mode and means for holding the batter checked against its tendency to splutter out of the molds when the steam is escaping during the period when the cores are being first let down into the new supply of batter; which checking action on the batter results in producing cones which are more perfect and of more solid texture around their open ends, rendering them less fragile and smoother along their brims and for some distance down their sides from their open ends.

A new mode and means of fashioning the revolving drum upon which the molds and cores are mounted and within which the baking is done, whereby one end of the drum is left open in a large area to give access to the interior of the drum and to permit using stationary burners which are mounted upon the general stationary frame and are supplied with gas from the outside.

These and other features of greater detail in their nature constitute the essential parts of my improved machine.

In the accompanying drawings forming a part of this specification and on which like numerals appear:

Figure 1 is a front elevation of my machine as a whole.

Figure 1ª is a detail view of the core supporting rail which prevents the dislodgment of the cores from the molds during that part of the revolution of the drum when the cores are not held in place by gravity.

Figure 2 is a rear elevation of the machine in its entirety.

Figure 2ª is a detail view of the batter mechanism.

Figure 2ᵇ is a detail view of a part of the same mechanism.

Figure 3 is a partial elevation and sectional view on the line 3—3 of Figure 2 looking in the direction of the arrows.

Figure 3ª is a detail transverse sectional view of a part of the drum showing one of the cross ribs by which the front and back plates are connected together.

Figure 3ᵇ is a detail view showing the mold lifting and core lifting rails.

Figure 5 is an enlarged elevation of a mold and core bar with the stripper plate and the means for actuating such plate to cause it to dislodge the cones from the cores.

Figure 6 is an enlarged detail view of the core bar lifting mechanism together with the means for properly positioning the core bar and cores at the time the cones are to be dislodged from the cores.

Figure 7 is a detail view of a core bar with an impaled cone, the stripper plate and the means for actuating the plate, the parts being shown nearing the act of dislodgment of the cones from the cores.

Figure 7ᵃ is a like view with the parts now in position to have dislodged the cones which are about to fall by gravity from the cores and to be thence carried away, in any convenient manner from the machine to the place of packing them.

Figure 8 is an enlarged side elevation in the nature of a diagram, of a segment of the drum with three successive molds, or the same mold shown in three positions. At a in the unloading position, the core bar and cores with their impaled cones having just been withdrawn and conveyed to the position shown in Figure 7; at b with the cores returned to the mold and the mold closed but with the core bar just entering upon the lifting rail to elevate the core sufficiently for loading the mold with fresh batter; and at c with the core at the apex of the rail and sufficiently out of the mold to now have the batter loaded into the mold, after which, by a further advance movement, the core bar traveling down the rail will return the cores into the mold to their final position and during which travel on the declined side of the rail the steam arising from the liquid in the batter and the hot mold will have escaped.

Figure 9 is a detail view showing the relative mold and core position when the core has returned to the mold after the extraction of the cone.

Figure 10 is a detail plan and sectional view showing the means by which the molds are slidably mounted in the front and back plates of the machine.

Figure 11 is a view showing the mold halves separated or in the extraction position.

Figure 12 is an enlarged transverse sectional view of a mold and the means for opening and closing the halves and for binding the mold halves together.

Figure 13:
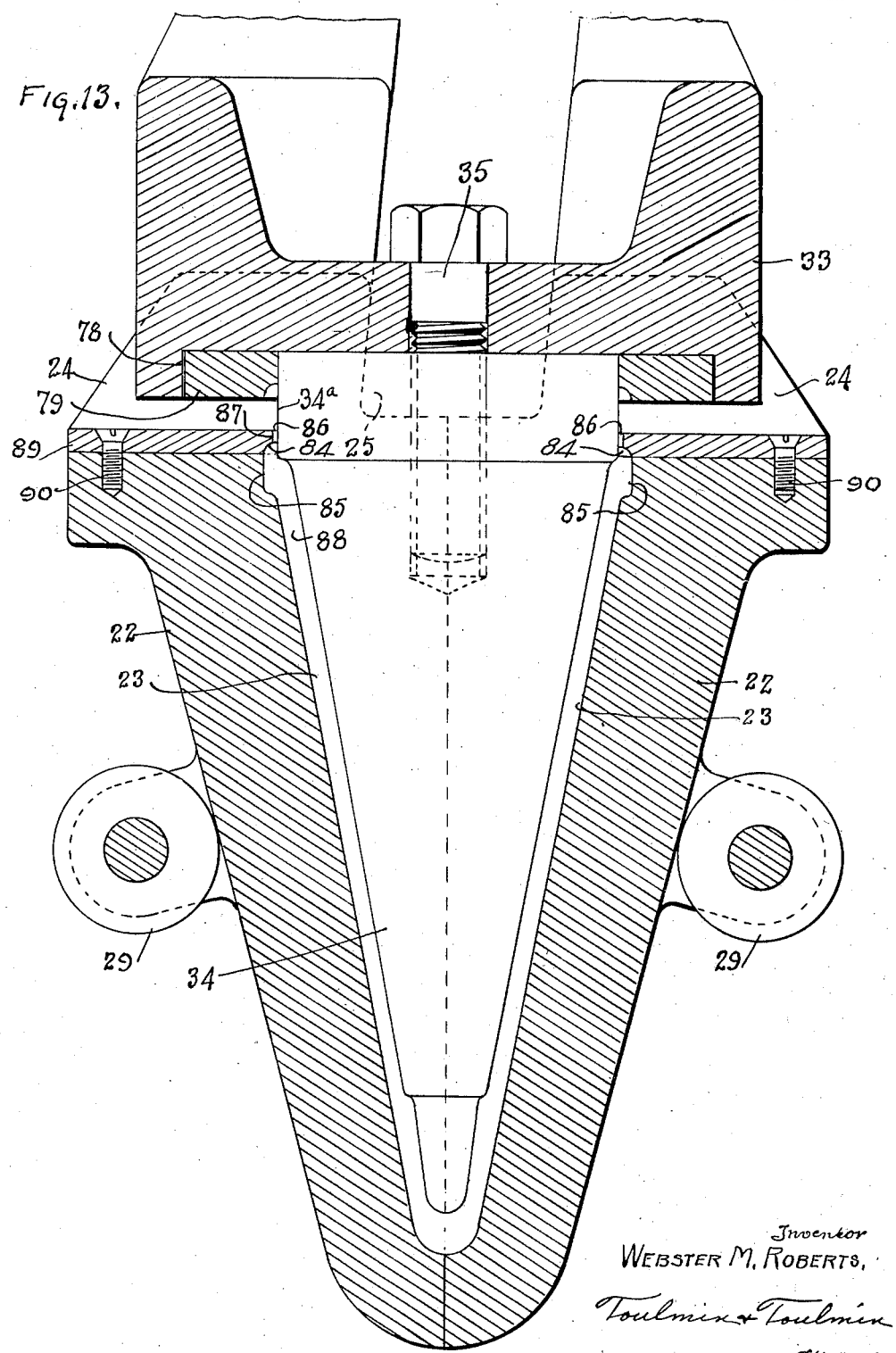

Figure 13 is an enlarged cross section of a mold and core bar with a core in elevation showing the relation of the mold and core parts and the stripper plate when the cores are seated in a mold and the batter has been displaced and made to fill the space between the walls of the core cavities and the cores, and showing also the means by which the tendency of the batter to splutter out when the steam is escaping is prevented and the cones are made more perfect with a more solidified texture and greater smoothness around their open ends.

Figure 14 is an enlarged side elevation showing the mechanism for extracting the cores and cones from the molds and for positioning the cores with the impaled cones for the dislodgment of the cones from the cores.

Figure 15 is a detail plan view of a portion of a core bar, its several parts and a portion of the front rail.

Figure 16 is a partial elevation and partial sectional view showing a core bar and the means by which its cores are withdrawn from the mold and positioned for the dislodgment of the cones.

Figures 17 and 17ᵃ are detailed views of the block for engaging the end of the core bar.

Figure 1:
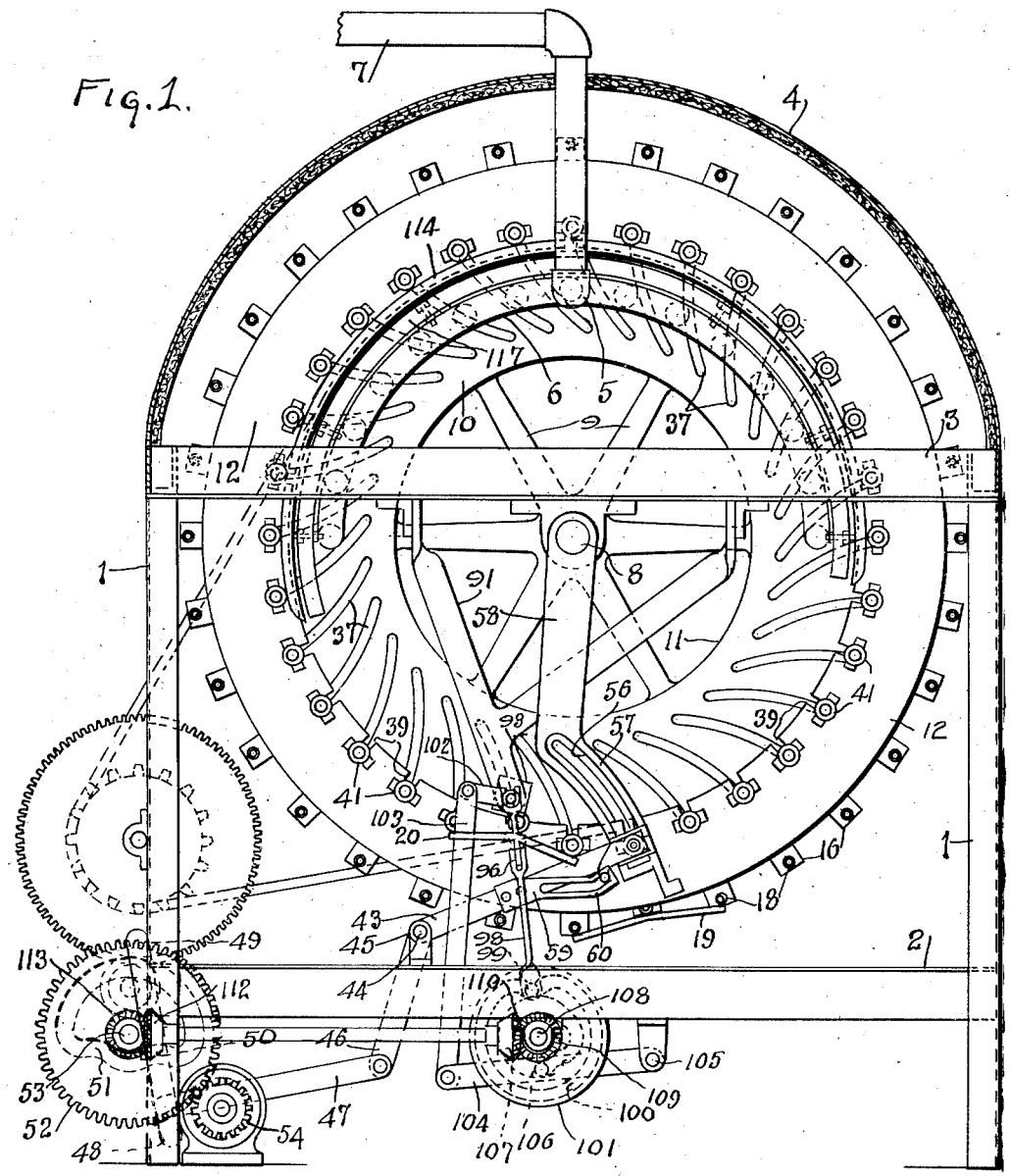

Referring now to the drawings in detail the numeral 1 indicates four upright members or posts which are connected together by side members 2 and 3 running from front to back and by other members 3 running from side to side. Thus a suitable frame is erected. Carried by this frame is an oven 4 preferably substantially semi-circular and fashioned in the nature of a hood so as to overlie and envelope the upper section of the drum with its molds and cores to form a heating enclosure which I denominate an oven because included within the hood are suitable gas burners. The gas burners comprise a main transverse pipe 5 from which tubes 6 having burners or burner orifices project laterally. The tubes 6 project both ways from the central pipe 5, as seen in Figure 1. A supply pipe 7 connects with the central pipe 5 and also with a suitable supply of gas or other fuel medium.

Figure 3:
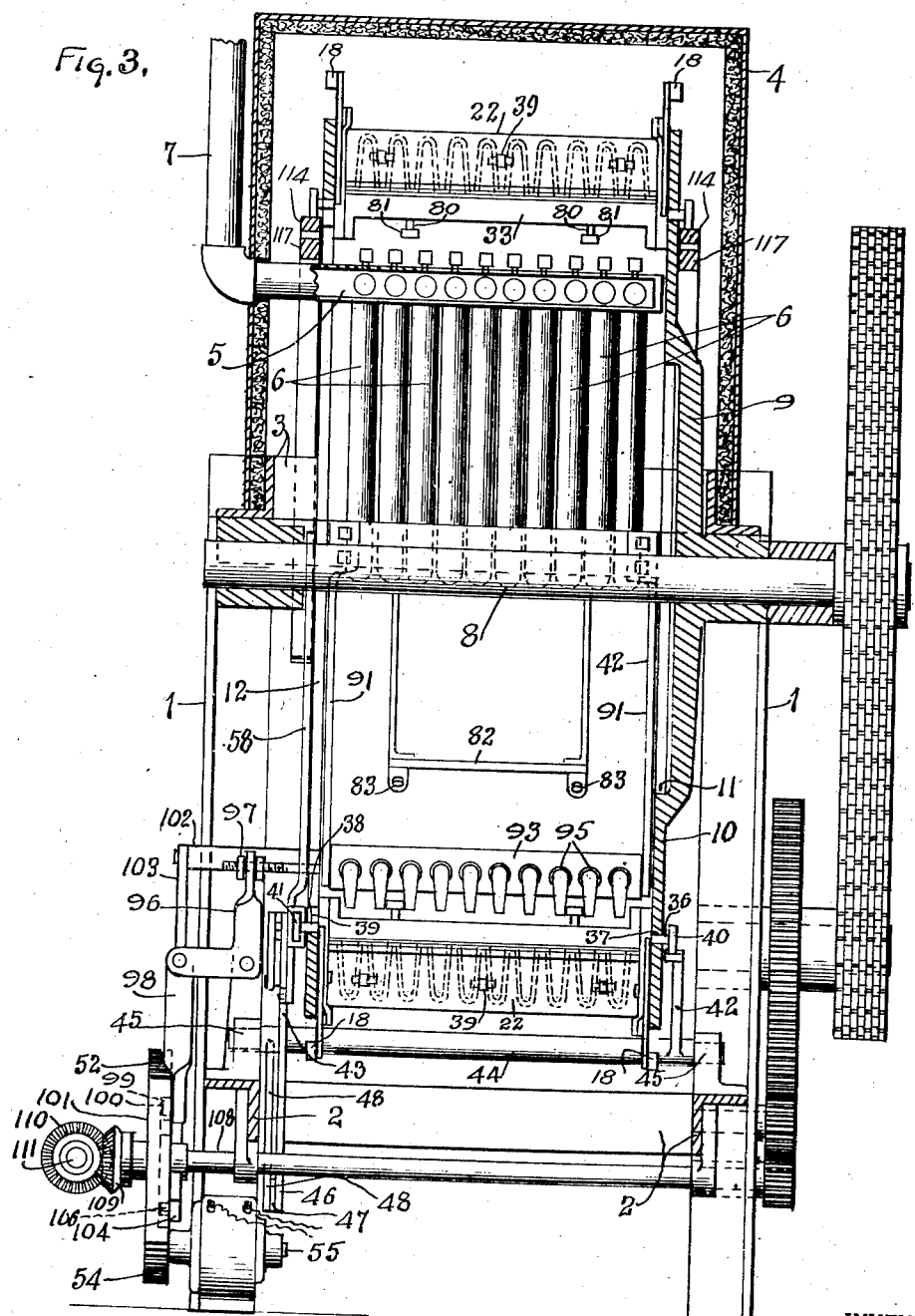

It will be observed that although the burners are within the rotating drum still the burners are stationary. This is made possible by the fact that the front end, to the left in Figure 3, is open, as will be more fully described later, whereby the drum in rotating does not come in contact with the burners although they are connected up with the outside supply pipe and are themselves located within the drum. This arrangement has the important advantage of eliminating joints, which often leak, when the gas is introduced through a hollow central drum shaft. And the further advantage that the burners are stationary and for that reason also are more easily kept gas-tight and require less repairing.

Mounted in suitable bearings on the cross members 3 which extend from side to side of the frame is the drum shaft 8 on which is erected the drum proper. To this end I provide a spider 9 fixed to the shaft 8 and having its arms connected in any suitable manner with what I term the back plate 10. This plate is a circular sheet of metal forming an annulus. The central portion of the plate is cut away as seen at 11 in Figure 3 to lighten the structure.

A front plate 12 in the nature of another annulus is connected with the back plate 10 by means of a series of cross ribs 13 which are preferably T-shaped in cross section to add strength as seen in Figure 12. Several screws or other fastenings 14 serve to connect these ribs with the two plates. In this way a strong but comparatively light structure is made. The front plate being a mere annulus of narrow width compared with the annulus of the back plate leaves a large opening in the face of the drum, so that I speak of the drum as having an open front. I referred above to one of the advantages of this open front— that of readily using a stationary interior burner without connections with the central shaft. Further advantages are those of accessibility to the interior of the drum at any time it may be required to readjust, repair or otherwise deal with any of the mechanism within the drum.

The molds and the core bars are mounted in these front and back plates. The manner of mounting the molds is by means of guides 15 in the nature of cleats secured to the front plate 12 and the back plate 10. See Figure 10. Within these guides are placed slidable plates 16. These plates carry the mold halves, as clearly seen in Figures 9 and 11. Each mold is composed of two halves. A hinge stud 17 projects from each plate 16. The mold halves are mounted on these studs so that when the plates 16 are adjusted, as will presently appear, up and down to open and close the mold halves they carry with them the molds. By now observing particularly Figures 8 and 11, it will be seen that the plates 16 are equipped with rollers 18. These rollers ride upon cam tracks 19 which are secured, in any convenient manner, to the frame of the machine as seen, for instance, in Figure 3ᵇ. When a roller on each of two plates 16, one at each end of a mold reaches these cam tracks they ride up the first incline and lift the mold so that its halves may swing apart to open the mold as seen at $a$ in Figure 8. Then when the rollers 18 travel on the declining portion of the cam rails the plates 16 descend and the mold halves are closed as seen at $b$ in Figure 8. The weight of the mold and its connections causes the mold to reseat by gravity as it slides down the decline of the cam rails.

Cam rails 20 are suitably supported by the general frame as indicated in Fig. 3ᵇ, for elevating the core bars with their cores to permit batter being introduced into the molds. These matters will be referred to later in connection with the operation of the machine. For present purposes, see Figure 8 where one of the rails 20 is shown in association with the mold and core bar and where the action of the rail 20 on the core bar in lifting it is clearly indicated in positions $b$ and $c$. After passing the apex of the rail the core bar, which for purposes of traveling on these rails is equipped with rollers 40, 41, will pass along the declining portion of the rails 20 and permit the core bar to fully insert the cores into the mold to displace the batter which by this time, as will hereinafter appear, has been introduced into the mold.

It will now be seen that the molds are mounted in the two end plates and are adjustable upward and downward when they come to the cam rails 19, while the core bars are also adjusted up and down with reference to the molds when they come to the cam rails 20. These rails are located in the lower part of the machine so that these operations on the molds and cores will take place while the molds and cores are passing along through a sector of their path at points near the lower part of the machine.

Referring now specifically to the molds and to the means by which they are positively opened when sufficiently elevated and by which also they are positively closed when sufficiently lowered, the numeral 22 designates the mold halves mounted on the hinge studs 17. Each half contains a series of partial cavities so that when the two halves are together a series of full cavities, indicated at 23 are formed for the reception of the batter and the cores. Each half is also provided with a lug 24 which when the halves are closed, leaves spaces 25 in the nature of notches for receiving and retaining a part of the core bars, as will appear later.

Each mold half has connected to it a link 26 on a pivot pin 27 slightly smaller than the hole in the link to allow the mold halves readily to be closed together, as will presently appear. These links at their other ends are pivoted on pins 28 secured to the front plate 12 and back plate 10, as shown in Figures 5 and 9 so that when the molds are lifted by the upward movement of the plates 16 these links draw back on the mold halves and open them, which occurs at the time the unloading of the cones is to be effected by the withdrawal of the cores with the cones impaled thereon.

Then for closing the mold halves I provide rollers 29 mounted on them and adapted as the molds are carried outward from the drum center to contact with fixed cam surfaces so as to bring the halves together. These cam surfaces are formed on bars 30 secured by bolts 31 to the cross members 13 which secure the front and back plates together. See Figure 12. The straight portions 32 of these bars keep the rollers 29 tightly pressed toward the mold halves and therefore not only close the halves but offer abutments to prevent the mold halves from spreading apart, particularly in the middle portion of the mold halves, due to excessive steam pressure which often develops during the process of baking the cones. The mold halves are preferably equipped each with three of these rollers 29, one near each end and one near the middle. Of course, they may be otherwise distributed and may be more or less in number according to the length of the molds and other conditions. When the molds have been closed by the travel of the rolls on the cam surfaces, they are held closed and against such tendency to spread by the contact of the rolls with the surfaces 32 of the bars, as before stated, whereby my molds are efficiently closed and held closed and equally spread or opened.

Figure 4:
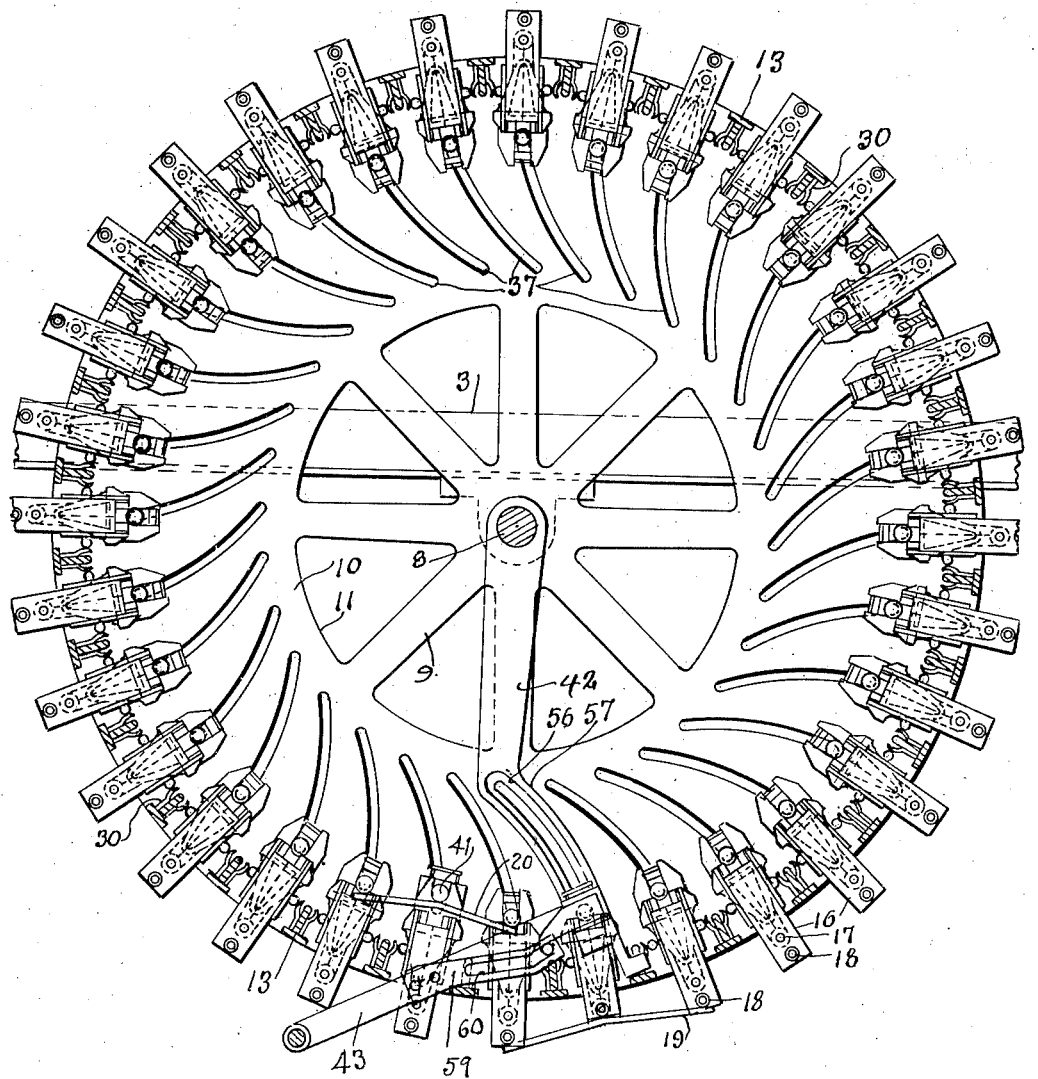
Figure 4 is a front elevation of the drum with the molds shown mounted therein and also the means for withdrawing the cores from the molds and returning them thereto.

Referring now to the core bars or arms which carry the cores, they consist each of the member 33 adapted to overlie the molds and having secured to them cores 34, corresponding in number for each bar with the number of mold cavities in each mold. The cores are secured to the bar by means of heavy screws 35 whose heads are accessible as will be seen from Figure 13. Studs 36 extended from the core bars pass through and fit curved slots 37 in the back plate 10, and other studs 38 project from the other end of the core bars and extend through slots 39 in the front plate 12. On the studs 36 are rollers 40, and on the studs 38 are rollers 41. These rollers are outside of the back plate and front plate respectively and are utilized when the core bars are to be lifted to withdraw the cores with the impaled cones from the molds at the time that the molds are to be unloaded of the cones. The preferred instrumentalities for so operating the core bars consists of an oscillating arm 42 to engage with and lift on the roller 40 at the rear end of the bar and a like oscillating arm 43, both mounted on a transverse rock shaft 44 having bearings at 45 on the main frame. This shaft is rocked at the proper time by a crank arm 46 actuated through a pitman 47 connected with a swinging link 48 pivoted to the main frame at 49 and having a roller 50 which travels in a cam 51 secured to a gear wheel 52 mounted on a shaft 53 which also has bearings secured to the main frame. A driving pinion 54 whose shaft 55 is driven by a motor, say an electric motor or by a belt from a line shaft, as may be desired, in turn drives the gear wheel 52 and hence the cam 51. The shape of the cam-way is such that the link 48 is actuated to reciprocate the pitman 47, the crank arm 46 and thence the oscillating arms 42 and 43 to lift the core bars with their cores and cones out of the molds when the molds shall have been lifted to the position shown at $a$ in Figure 8, at which time they are open, having severed themselves from the adhesion of the cones, and left the cores ready to be lifted out of the molds. In this movement the core bars are guided at their rear ends by the curved slots 37 in the back plate as more clearly seen in Figure 4, while at their forward ends the core bars are guided by the slot 56 formed in the lower branch 57 of a swinging bar 58 mounted loosely on the drum shaft 8. The slot 56 conforms in curvature and direction with each of the slots 37 in the back plate so that the core bars travel equally and in the same direction at both ends. They travel up these slots until they reach a position at or near the upper ends thereof by which time the core bars with their cores and impaled cones will have assumed the position shown first in Figure 7 and a moment later in that shown in Figure 7$^a$. But during this travel of the core bar it has also undergone another movement, a tipping movement to change the cores from a substantially vertical position at the commencement of the movement to the inclined position shown in Figures 7 and 7$^a$. The instrumentalities for causing this swinging movement of the core bars to incline the cores comprise a branch member 59 secured to and extending at an angle from the oscillating bar 43. This branch has a slot 60 in the nature of a cam. In this cam slot is mounted to travel a roller 61 mounted on a stud carried by a bracket 62 fitting over the squared portion 63 of a stud 64 which projects from a hollow block 65 slidable along the lower part of the swinging bar 57. The oscillating arm 43 also engages with this hollow block by fitting over the circular projection 66 thereof. The oscillating arm 43 is loosely clamped between the hollow block 65 and the bracket 62 so that the block can both slide and rotate on the arm 43 as the block moves along the bar 57. In turn, the hollow block receives in its interior, its ends being open, the roller 41 which is carried, as before described, by the core bar, through a stud bolt 67 screwed into the stud 38 which extends integrally from the core bar. The inner face of the hollow block is grooved transversely to receive the oblong head 38$^a$ of the core bar, so that turning of the block will also turn the core bar. The oscillation of the arm 43 is so timed that it positions the block 65 at the lower end of the bar 58 just in time for the block to receive the roller 41 and the head 38$^a$ of the next core bar presented by the drum in its rotation. As the block engages the roller and head the arm 43 starts to rise and lifts the end of the core bar, the other end being lifted by the arm 42. The friction between the engaged parts of the block and core bar hold the parts together during the upward and downward movement of the core bar.

I before stated that the bar 58 is a swinging bar. It is made to swing or travel with the drum as each of the succession of pins 68, carried by the drum passes under the detent 69 pivoted at 70 to this arm. In this way the detent being drawn by the pins 68 drags the arm with it until the detent rides off of the pin due to being elevated by the roller 71 held by a stationary arm 72 secured to the frame member 2. During a part, say six-sevenths of this movement or swing of the arm 58 the hollow block 65 through its projection 66 traveled along in the slot 73 formed in the oscillating arm 43; and the roller 61 on the bracket 62 also traveled along the cam slot 60 formed in the branch 59. The effect of these movements is to swing the core bar on its projections or studs 36 and 38 from the position, which is nearly vertical, of the cores when they leave the molds to the inclined position shown in Figures 7 and 7ª. The latter position is appropriate to the dislodgment of the cones from the cores in the desired direction to catch them by any form of conveyor or means by which they are conveyed from out of the drum to the place of packing.

Thus it will be seen that the core bars and cores with their impaled cones have a compound movement—a traveling movement up the slots 37 of the back plate and up the slot 56 of the swinging arm 58, and a partial rotary movement on the axis of the core bars themselves. The degree of the latter movement and hence the particular inclination or position of the cores relative to a horizontal line may be varied without departing from the spirit of this part of my invention.

So far I have referred only to the upward and tilting movements of the core bars, one after another as they come along and are actuated by the devices just described, but there is of course a return movement, the reverse of the movements of the core bar and cores just described. This return movement occurs when the cam 51 and intermediate devices by which the oscillating arms 42 and 43 throw these arms downward, as they do in due course of the revolution of the cam 51. During this downward or return movement of the core bar through the action of the arms 42 and 43 the cores are righted up from their inclined to their substantially vertical position through the continued movement (to the left in Figure 6) of the roller 61 in the slot 60 of the branch arm 59.

During the swinging movement of the arm 58 the core bar makes its upward and return travel, during the latter of which the cores resume their substantially vertical position by the aforesaid further movement of the roller 61 to the left in the slot 60.

During said swinging movement of the arm 58 the drum is of course rotated, carrying the molds with it. And the drum, of course, continues to rotate after the swing of the arm 58 is ended by the disengagement of the detent 69 from the pin 68 by the roller 71. The continued movement of the drum after this event serves to bring the mold from the position $a$ in Figure 8 to the position $b$. To let the core bar down for the cores to now re-enter the mold in its position $b$ the arm 58 must be swung back to its full line position in Figure 6. In swinging back it withdraws the open ended block 65 from the core bar roller 41 and thereby lets the bar down and the cores re-enter the mold at position $b$. The inclination of the bars 42 and 43 bring the core bar down, while its roller is yet within the block 65, to a position where the cores have entered the cavities in the mold, and the projections 25ª on the ends of the core bar have entered somewhat in the space 25 between the lugs 24. Therefore when the arm 58 swings the hollow block entirely clear of the core bar roller 41, the core bar settles down on the mold as indicated at $b$ in Figure 8.

I will now describe the devices by which the swinging arm 58 is returned from the dotted to the full line position as shown in Figure 6. These devices comprise the lever 73ª pivoted on a pin 75 sustained by the general frame and slidingly connected with the extension 57 of the arm 58 by means of the slot 74, and the pin 76, the former in the lever 73ª and the latter mounted on the arm extension 57. The lower end of this lever 73ª is fashioned with a nose 77. As the arm 58 makes its swing from the full line to the dotted line position it causes this nose to move to the position shown in dotted lines which is just ahead of the pin 68 that travels with the drum. As this swing of the arm 58 terminates at the time that the pin 68 reaches about the position shown in Figure 6, the further movement of the drum and pin will cause the pin to now engage the nose 77 and carry it along until it rides off of the pin during which time the long end of the lever 73ª has acted to return the arm 58 from the dotted to the full line position. The location of the lever 73ª is such that it is to the rear of the roller 71 and so does not come in contact with it.

Thus it will be seen that the swinging arm 58 is moved from one of its positions to the other by the travel of the drum, a pin 68 first acting on the detent 69 to swing the arm in one direction and then such pin acting on the lever 73ª, through a short distance of its travel to swing the arm back to the other position.

It will now be seen that the mechanism here described affords one form of devices which are effective to give to the core bars the requisite movements involved in extracting them with the impaled cones on their cores from the molds, in positioning the cores appropriately for the convenient dislodgment and gathering of the cones and for returning the core bar to the same mold from which it was withdrawn but at a time when such mold shall have traveled from position $a$ to position $b$, as shown in Figure 8.

While I prefer the detail mechanism above described for this purpose, I wish it understood that I do not confine myself to it but rather that this part of my invention embraces any mechanism suitable to give to the core bar the movements above described, such movements including the lifting of the core bars from the molds at one position and returning them, respectively, to the molds when they have moved to another position.

Referring again to the core bars and to the hollow block 65 it will be noted from Figure 15 that there are lugs or projections 38ª extended from the studs 38. These lugs 38ª enter the hollow block 65 along with the roller 41 and serve to cause the core bars to assume whatever position is assumed by the hollow block in its movements in the slot 56 of the arm 58, so that when this block is swung by the action of the roller 61 in the cam slot 60 of the branch arm 59 (see Figure 6) the core bar will be tilted accordingly for the purpose of properly positioning the cores for the dislodgment of the cones. In this connection also observe that the hollow block is open at both ends so that the roller 41 may readily enter one end and pass out of the other, so that the core bars with their lugs 38ª and their cores all travel into one end and out of the other end of the hollow block 65.

Referring again to the dislodgment of the cones from the cores it will be observed, particularly from the Figures 7, 7ª and 13, that the core bar is provided with a recess 78 which extends throughout the length of the bar. Within this recess is located a cone-dislodging or stripper plate 79. This plate has a series of holes in it which fit about the upper portion or necks of the cores. Connected to the plate 79 are pins 80, see Figures 7, and 7ª, which pass through the core bar and at their upper ends are connected together by a cross strip 81. Secured to the general frame is a stop bar 82 having adjustable stops in the nature of bolts indicated at 83. When the core bars are lifted to the position shown in Figure 7ª the cross strips 81 come in contact with the stops 83 and the dislodging plate is forced from its recess 78 in the core bar outward along the cores which causes it to contact with the cones and to dislodge them from the cores. When the core bar returns to the mold the now projecting dislodging plate strikes the mold face as the cores enter and is forced back into the recess 78.

It will thus be seen that I provide for the automatic and effective dislodgment of the cones from the cores in a manner that is quick and yet does not injure or tend to break the cones.

Another feature of invention and advantage in respect to my cores and molds lies in means for checking and minimizing the spluttering out of batter from the molds during the period when the molds are steaming when fresh batter has been introduced into them, their heat causing steam to generate and escape past the neck of the cores. The purpose in minimizing the escape of batter at this time is to reduce the formation of fins on the upper surface of the molds and more particularly to cause the upper open end of the cones to be more perfect and of more solid texture. By checking the discharge of batter at this point the resulting texture of the cone is found to be firmer and more solidified, which adds to the smoothness and strength of the product so that both improved appearance and resistance to breakage in transportation are obtained. These objects are carried out by the following devices:—

A shoulder 84 on the mold overhangs the counter-bore 85 in the cavity and leaves a very narrow space 86 between the throat 87 of the mold and the neck 34ª of the core, all as best seen in Figure 13. This shoulder 84 overlies the major portion of the thickness of the cone itself indicated at 88. It will be seen that while the clearance or space 86 affords a sufficient annular passage for the escape of steam after the core has descended so that its neck 34ª is well within the cavity, still that the shoulder 84 overlies the major portion of the thickness of the batter which is later to be baked to become a cone. In this way, by this combined provision for steam escape and batter checking, I am enabled to improve the texture of the cone in its upper or open portion, to add to its strength and to make it smoother in appearance, while at the same time I enable the escape of the steam and also prevent the formation of excessive fins on the mold top formerly due to excessive escape of batter. And this steam escaping and checking of the batter continues during the whole period of the passage of the neck 34ª down into the mold cavity and until the core bar finally seats firmly upon the mold top. The extended length of the neck 34ª of the core prolongs the period during which the batter is checked from escape and yet the steam is allowed to issue out.

I prefer to form the overhanging shoulder 84 on plates 89 separate from the mold halves and to secure such plates to the upper faces of the mold halves in any appropriate way as by counter-sunk screws indicated at 90 in Figure 13.

I shall next refer to the batter mechanism. The type of construction I prefer to use is that shown in the patent to W. M. Roberts (myself) and P. D. Roberts, No. 1,147,974, dated July 27, 1915. But I slightly modify that type in which the tank was stationary and the individual nozzles that fed the batter were made adjustable to move to and from their discharging position to deliver batter into the molds. Instead, in the present case I tip the batter vessel as a whole so that its projecting nozzles will readily approach to the molds to deliver batter and recede from them automatically. Attached to the member 3 or other suitable part of the general frame are hangers 91 in which I mount the trunnions 92 of the batter tank 93, as seen more clearly in Figure 2ᵇ. A slide valve 94 is mounted concentrically with the trunnions 92 so that it may be operated in any position of the tank 93. The tank being swung on the trunnions in the hangers may readily be tipped to present its nozzles 95 to the passing molds to deliver batter and which may readily recede as each mold is filled. In position c of Figure 8 the mold cavities are filled and the nozzles swing down to substantially the position indicated in dotted lines in that figure. The means for reciprocating the slide valve 94 and the means for tipping the tank to position the nozzles are as follows: A bell-crank lever 96 works between collars 97, see Figure 2$^b$, and is operated by a pitman 98 connected at one end to this bell-crank lever and having a roller 99 at the other end which travels in the cam-way 100 formed in the cam 101. The formation of the cam-way and its position are such that it will reciprocate the valve 94 to register its ports with those in the bottom of the tank. In this way the batter is periodically supplied to the nozzles.

The means for tipping the tank comprise the arm 102 projecting from the tank, the pitman 103 pivoted to such arm and to a lever 104 pivoted at 105 and having a roller 106 which travels in another cam-way 107 in the cam head 101. This cam-way 107 vibrates the lever 104 which reciprocates the pitman 103 which in turn oscillates the arm 102 and thus tips or rocks the batter tank to properly position the nozzles 95. See Figures 2 and 2$^b$ in connection with the above description.

The cam head 101 is mounted on a shaft 108 suitably supported by the main frame. The cam carries a bevel gear indicated at 109. This gear meshes with a bevel pinion 110 carried on a shaft 111 and having at its other end another bevel pinion 112 which meshes with a bevel pinion 113 to drive it and which is carried on the shaft 53 which receives motion through the gear 52 and driving pinion 54, before described.

Thus it will be understood that the batter tank is oscillated to present the batter nozzles in position to discharge into the molds at the appropriate time and to return the nozzles to what may be called normal position. The form and position of the cam-ways 107 and 100 are such as to produce this oscillation and operate the slide, respectively, at the appropriate times.

I have heretofore referred to the fact that the molds and core bars travel with the drum. The core bars are retained in place on the molds by gravity until such time as they approach a horizontal line extended from the center of the drum at that point on one side clear around to the same point on the opposite side of the drum.

The means I employ for retaining the core bars against the molds during that period of their travel consists of a yieldable rail or track 114 as best seen in Figures 1 and 1$^a$. This track is supported upon springs 115 placed about slidable pins or bolts 116 screwed into the rail 114 and slidable in the fixed curved bar 117. In this way the rail 114 maintains a constant outward pressure which keeps the core bars with their cores well seated with respect to the molds. The rollers 40, 41 on the ends of the core bars travel on this pressure track 114. The curved bar 117 is secured by bolts 118, or otherwise, to the cross member 3 of the general frame. It will be understood that there are one pressure rail and one curved bar near the front of the drum and another pair near the back thereof so that the core bars are so supported at both ends.

The drum may be rotated in any convenient manner.

The operation of my machine will doubtless be understood from the foregoing description. But by way of summary I will state that the order of the operation of the major features of the invention is substantially as follows:

Assuming the machine to be standing idle with the molds closed, the cores in the molds and the batter only in the tank, the drum is put in motion through the driving mechanism described. When a mold and core bar reach the position shown at c in Figure 8 the core bar has been slightly elevated and the mold is ready for batter. At that time the batter nozzles by the tipping of the tank swing into position, such as shown by the dotted lines in Figure 8, and load the mold. As this is being done the mold and core are traveling clockwise. The declining side of the rail 20 permits the cores to settle down into the mold and displace the batter to cause it to fill the narrow space between the mold cavities and the cores. The molds being hot the moisture in the batter will result in the generation of steam. Then takes place the important function of checking the batter from spluttering out of the mold. This function is accomplished by the means described with reference to the overhanging shoulder 84 and the elongated neck 34$^a$ of the cores. The mold and core now in question pass on clockwise, the core bar being held in position by gravity until the rollers on the ends of the bar begin to ride on the retaining rail described, which then acts to maintain the core bar in position with respect to the mold.

As each mold and core bar reach the position indicated at c in Figure 8 these operations are repeated. In due course all of the molds will have been filled with batter and they will successively pass on until they come within the baking zone within the oven 4. Passing through it, the molds each with its core bar finally arrive in succession at the point indicated at a in Figure 8. As each mold after leaving the declining track 19 has its halves clamped together by the gravity-descent of the mold down between the pressure cams 30 and remained clamped together throughout the rotation, so now when each mold reaches the inclined side of the rail 19 it is elevated and its halves opened by the action of the links 26, a condition shown in Figure 12. Then when the mold reaches the position shown at *a* in Figure 8, its adhesion to the cones having been broken, the core bar with its cores and impaled cones is lifted out and made to travel up to the position in Figure 7 through the instrumentalities before described. Reaching the position illustrated in Figure 7ª the dislodging plate is actuated and the cones are dislodged and gathered within the drum in any convenient manner to be conveyed off to the place of packing.

These steps or performances are repeated as mold after mold reaches the mold opening stage, core withdrawing step, cone dislodging act and batter filling act. Intermediate the withdrawing of the cores from the molds and the charging of the batter, the cores are returned to the closed mold as shown at *b* in Figure 8. But in the meantime, between the withdrawal of the cores from the molds in position *a*, the cores have made their circuit up to the dislodging position, the cones have been dislodged and the cores have returned to meet their particular mold and reenter as seen at *b* in Figure 8. Then it is that passing up the inclines 20 the rollers 40, 41 on the core bar lift the cores partially out of the molds for admitting the charge of batter, as seen at *c* in Figure 8.

It will be observed that these successive operations all take place by reason of motion derived from a common source and that because of the described positioning of the operating cams and the parts actuated thereby the several steps take place in appropriate succession, one after another, all of the operations being performed in such close succession that in practical effect the machine has cores which are withdrawing from the molds, are having their impaled cones dislodged and are returning each to their own mold at the same time that other cores are but partially in the molds and batter is being charged therein. All this results in a machine which rapidly produces complete and highly perfect cones in great quantities in a given time. The machine here set forth will produce from 180,000 to 200,000 of these highly perfect cones in twenty-four hours.

It will now be seen how I carry out into practical and useful effect the objects heretofore stated—the new mode and means of withdrawing the cores from the molds; the new mode and means of dislodging the cones from the cores; the new mode and means of closing and maintaining firmly closed the mold halves; the new mode and means of checking the spluttering out of the batter during the steaming period with the resultant more perfect cones and more solidified texture thereof at and about their open ends; the new mode and means of opening the mold halves through the links which draw the halves apart when the molds are elevated; and the accessibility to the interior of the drum through the projection of the open end thereof.

These and other advantages are obtained as a result of this invention.

Having thus fully described my invention, what I claim as new and desire to secure by Letters Patent of the United States, is:—

1. In a machine of the character described, the combination with a rotatable drum, and a series of separable molds and cores therefor mounted in said drum, of means in one part of the arc of their movement to retain the cores in the molds, and means in another arc of their movement for opening the mold halves, other means for withdrawing the cores with the cones impaled thereon and for returning the cores to their mold, and other means for dislodging the cones from the cores between the withdrawal and return of the cores from and to their mold, and other means for positioning the cores and mold for a batter charge, and batter mechanism for that purpose, and means to supply heat to bake the article.

2. In a machine of the character described, the combination with a rotatable drum and a series of separable molds and cores therefor mounted in said drum, of means in one part of the arc of their movement to retain the cores in the molds, and means in another arc of their movement for elevating the molds inward and opening the mold halves, other means for withdrawing the cores from their open mold and for returning the cores to their mold, and means for placing the cores in an angular position during their said travel, and means for dislodging the cones from the cores after the cores have assumed such angular position, other means for partially lifting the cores from their mold for a batter charge, batter charging means for that purpose; means to allow the cores to reseat in their mold to displace the batter; means on the mold to restrict the spluttering out of batter during the steaming period as the cores descend to final position in their mold; and means to bake the batter while in transit.

3. In a machine of the character described, the combination with a rotatable drum having front and back plates, and molds with their cores movably mounted in said plates, of means for moving each mold inward from the plates, means to open the molds during their inward movement, means to withdraw the cores with the impaled cones from their opened mold and to return the cores to their mold, means to position the cores for dislodgment of the cones between their withdrawal and return to their mold, means for dislodging the cones during such time, means for elevating the cones partially from their mold for a batter charge, batter mechanism including nozzles adapted to approach to and recede from the molds, means to permit the cores to seat in their mold and displace the batter charge into the space between the cores and the mold cavities, means to restrict the spluttering out of the batter during the steaming period when the cores are not fully seated, means to bake the batter in its transit in the molds, and means for retaining the cores in the molds during that part of their movement when not so held by gravity.

4. In a machine of the character described, the combination with a rotatable drum and molds and cores carried thereby of mechanism including lifting arms operating to engage opposite sides of the cores to move the same during the travel of the drum for withdrawing the cores with their impaled cones from and returning them to their mold, means for positioning the cores during their travel to and from their molds for dislodging the cones, and means to act in that interval for dislodging the cones from the cores.

5. In a machine of the character described, the combination with a rotatable drum and molds and cores carried thereby, of means including lifting arms operating to engage opposite sides of the cores to move the same during the travel of the drum for extracting the cores with their impaled cones from their mold, and for returning the cores to their mold, such means having a movement in the direction of the movement of the drum so that the cores will leave their mold at one position of the mold and return to their mold when it is in another or advanced position.

6. In a machine of the character described, the combination with a rotatable drum and molds and cores carried thereby, of means for extracting the cores with their impaled cones from their mold, and for returning the cores to their mold, such means having a movement in the direction of the movement of the drum so that the cores will leave their mold at one position of the mold and return to their mold when it is in another or advanced position, and means for then partially withdrawing the returned cores from their mold to admit of charging the molds with batter, and batter means adapted to effect such charge of batter when the cores are so partially withdrawn.

7. In a machine of the character described, the combination with a rotatable drum and molds and cores carried thereby, of means for extracting the cores with their impaled cones from their mold when in one position and for returning the cores to their mold when in a later or advanced position, such means comprising lifting arms to actuate the core bar of the cores and a swinging arm adapted to have movement with the drum, and devices to return such swinging arm to normal position.

8. In a machine of the character described, the combination with a rotatable drum and molds and cores carried thereby, of means for extracting the cores with their impaled cones from their mold in one position and returning the bare cores to their mold in a later position, such means comprising guide slots for the core bar, one slot being in the drum structure and the other in a swinging arm, such arm having movement with the drum during the interval when the cores are being extracted from their mold and returned thereto in its later position.

9. In a machine of the character described, the combination with a rotatable drum and molds and cores carried thereby, of means for extracting the cores with their impaled cones from their mold when in one position and for returning the cores to their mold when in a later or advanced position, such means comprising lifting arms to actuate the core bar of the cores and a swinging arm adapted to have movement with the drum, and devices to return such swinging arm to normal position, and means for dislodging the cones from the cores during the interval between their extraction from and re-insertion in their mold.

10. In a machine of the character described, the combination with a rotatable drum and molds and cores carried thereby, of means for extracting the cores with their impaled cones from their mold in one position and returning the bare cores to their mold in a later position, such means comprising guide slots for the core bar, one slot being in the drum structure and the other in a swinging arm, such arm having movement with the drum during the interval when the cores are being extracted from their mold and returned thereto in its later position, and means for dislodging the cones from the cores in the interval between the extraction of the cores from and their re-insertion in their mold.

11. In a machine of the character described, the combination with a rotatable drum and molds and cores carried thereby, of means for withdrawing the cores with their impaled cones from their mold and returning the naked cores to their mold in a later position, such means comprising a guide slot in the drum, a swinging arm having a guide slot, actuating arms to act on the core bar to give it such movements, means for positioning the cores at an inclination during the interval between their withdrawal from and re-insertion in their mold, means for causing the swinging arm to travel with the drum and to return to normal position, and means to dislodge the cones from the cores when so inclined.

12. In a machine of the character described, the combination with a rotatable drum having plates provided with slots, the slots in one plate being elongated, of means for extracting the cores with their cones from their mold while in one position and re-inserting the stripped cores in their mold in a later position, such means comprising a swinging arm adapted to travel with the drum and means to return such arm to normal, the arm having a guide slot corresponding to the guide slots in the drum plate, and means which position the cores at an inclination between their withdrawal from and reinsertion in their mold, and other means to dislodge the cones from the cores.

13. In a machine of the character described, the combination with a core bar having cores, of means for moving such bar from and back to a mold with which it is adapted to cooperate in baking cones, such means comprising guides for the ends of the core bar, including a swinging arm, means on the arm to receive and discharge the end of the core bar, oscillating arms which move the core bar from one position to another.

14. In a machine of the character described, the combination with a core bar having cores, of means to guide one end of the bar, a swinging arm to guide the other end thereof, an open-ended block to receive and discharge the core bar, and oscillating arms, one of which moves one end of the core bar and the other moves the said block, and other means to cause the swinging arm to move from one position to another.

15. In a machine of the character described, the combination with a drum and molds and core bars mounted thereon, of means for withdrawing the cores from their mold while in one position and returning them to their mold when in another position, such means comprising a guide for each end of the core bar, a swinging arm in which one of the guides is formed, oscillating arms for so moving the core bar, an open ended block connected to one oscillating arm, the core bar at one end being adapted to enter in and discharge from said block, means to cause the oscillating arm to travel with the drum a predetermined distance, means to return such arm to normal position, and means for positioning the cores at an angle, such means comprising a branch slotted member secured to one of the oscillating arms and a bracket connected with said block and having engagement with the slot in the branch member.

16. In a machine of the character described, means for operating a core bar comprising a slotted swinging arm, an oscillating arm having an open-ended block adapted to receive the end of a core bar, a branch member having a cam slot, and a bracket secured to the block and operating by such cam slot to change the angular position of the block and thereby angularly position the cores of a core bar.

17. In a machine of the character described, the combination with a rotatable drum and a mold and core bar carried thereby, of a swinging slotted arm, a detent carried thereby and adapted to be drawn by the drum a predetermined distance, a device to disengage the detent from the drum, the swinging arm having an extended curved slot, an open-ended block adapted to travel in said slot and to receive and discharge the end of such core bar, an oscillating actuating arm connected with such block, a branch member connected to such arm and having a cam slot, a bracket secured to the block and having a part within said slot, and a lever connected to the swinging arm and adapted at one end to move therewith and at the other end to be engaged by the drum to throw the swinging arm back to normal position.

18. In a machine of the character described, the combination with a core bar having at its end a roller, of a hollow open ended block adapted to receive and discharge such roller, a swinging arm having a slot adapted to receive and guide said block, an oscillating actuating arm having a slot which receives a projection from the block, a branch member secured to such actuating arm and having a cam slot, a bracket secured to the block and having a part adapted to travel in such cam slot, whereby the core bar may be manipulated to and from its mold and may be positioned angularly for the dislodgment of cones from its cores.

19. In a machine of the character described, the combination with a revoluble drum and molds and cores carried thereby, of means to remove the cores from the molds and back again, means carried by the core bars to dislodge the cones from the cores and other means adapted to actuate the dislodging means; the cores, the dislodging means and the actuating means all being within the drum, and the means for so moving the cores being without the drum.

20. In a machine of the character described, the combination with a rotatable drum having an open end and molds and core bars carried by said drum and movable inward into the space within the drum, of means exterior of the drum for so moving the cores and their bar, means carried by the core bar to dislodge the cones, and means within the drum to actuate the dislodging means, whereby the operations of removing the cores with their cones from the molds and the dislodgment of the cones are carried on within the drum and the means for so actuating the cores are without the drum, the open end of the drum facilitating the discharge of the cones from the machine.

21. In a machine of the character described, the combination with a rotatable drum and molds and core bars carried thereby and within the same, of vibrating arms located outside of the drum and adapted to engage projecting ends of the core bars to remove the cores with their impaled cones from the molds and to return the stripped cores into their molds, and means for directing the course of the core bar in its travel from its mold while in one position back into its mold when the mold is in another position.

22. In a machine of the character described, the combination with a rotatable drum comprising a hollow open-ended structure and having means at its periphery for the retention of associated molds and core bars, and slots in a side for the guidance of one end of the core bars, and separable molds and core bars combined therewith.

23. In a machine of the character described, the combination with a rotatable drum comprising a hollow open-ended structure and having means at its periphery for the retention of associated molds and core bars, and slots for the guidance of one end of the core bars, and separable molds and core bars combined therewith, of a swinging arm on the open face of the drum having a guiding slot corresponding with those in the drum itself, oscillating actuating arms outside of the drum to move the core bars to withdraw the cores from the molds with their impaled cones, a dislodging plate on the core bars and means within the drum to actuate the dislodging plate, means outside of the drum to angularly position the cores to the cone-dislodging position within the drum, and stationary burners within the drum having their supply pipe extended through the open end.

24. In a machine of the character described, a rotatable drum having back and front plates each having a series of spaced slots or openings, and molds associated with core bars having projections which ride in said slots or openings for guidance of the core bars in open relation to the molds, carrying means in the periphery of the drum for the molds and cores, and means to maintain the molds and cores in place when revolving outside of the segment in which gravity will retain them in place.

25. In a machine of the character described, the combination of a rotatable frame, sectional molds carried thereby and having cone cavities therein, cores for the respective cone cavities, a stationary cam, means on the molds adapted to engage the cam to lift the molds in the direction of the axes of the cone cavities, means for opening the mold sections as they are lifted, means for withdrawing the cores with the cones baked thereon from the open mold sections, and means for discharging the baked cones from the withdrawn cores.

26. A mold unit for a cone baking machine comprising, a sectional mold, a core therefor, means for lifting the mold sections, means for opening the mold sections as they are lifted, inclined cams cooperating to close the sections as they are returned by gravity, means for withdrawing the core from the opened mold with the cone thereon, and means for stripping the cone from the core.

27. A mold unit for a cone baking machine comprising, a sectional mold, a core therefor, means for lifting the mold and core together, means for opening the mold sections as they are lifted, means for withdrawing the core and cone from the opened mold, means for stripping the cone from the core, and means pressing against the sides of the mold sections to close them as they are returned by gravity.

28. In a cone baking machine, the combination of a rotatable frame, sectional molds mounted thereon, cores for the sectional molds, stationary cam means for lifting the mold sections at one point in their rotation, means secured to the frame for each mold adapted to open the mold sections as they are lifted by the stationary cam, means secured to the frame for each mold to close the mold sections when the mold drops by gravity on leaving said stationary cam, means for lifting the cores from and returning them to the molds, means for supplying batter to the molds, and means for pressing the cores firmly down on the molds after they have been supplied with batter.

29. A method of extracting ice cream cones and the like from baking machines having divided molds, cores and stripper plates consisting in moving the molds, cores and stripper together in a direction parallel to the axes of the mold cavities, separating the mold sections laterally while moving them parallel to their axes to free them from the baked cones but leaving the baked cones on the cores, lifting the cores and strippers from the opened mold sections with the baked cones on the cores, and subsequently moving the strippers along the cores to discharge the baked cones therefrom.

In testimony whereof, I affix my signature.

WEBSTER M. ROBERTS.